United States Patent [19]

Pettersson et al.

[11] Patent Number: 5,285,814
[45] Date of Patent: Feb. 15, 1994

[54] VALVE-SETTING DEVICE

[75] Inventors: Hans Pettersson, Huddinge, Sweden; Peter Merz, Versoix, Switzerland

[73] Assignee: AB Mecman, Stockholm, Sweden

[21] Appl. No.: 856,208

[22] PCT Filed: Nov. 14, 1990

[86] PCT No.: PCT/SE90/00736
§ 371 Date: May 12, 1992
§ 102(e) Date: May 12, 1992

[87] PCT Pub. No.: WO91/08411
PCT Pub. Date: Jun. 13, 1991

[30] Foreign Application Priority Data

Nov. 24, 1989 [SE] Sweden ............................ 8903977

[51] Int. Cl.[5] ............................................. F16K 37/00
[52] U.S. Cl. ................................. 137/556; 251/129.03; 251/251; 137/271; 137/797
[58] Field of Search ............... 251/129.03, 129.15, 251/367, 251; 137/556, 271, 68

[56] References Cited

U.S. PATENT DOCUMENTS

| | | | |
|---|---|---|---|
| 2,828,102 | 3/1958 | Larson | 251/129.03 |
| 3,236,494 | 2/1966 | Frantz | 251/129.03 |
| 3,238,968 | 3/1966 | Pecis . | |
| 3,351,093 | 11/1967 | Frantz . | |
| 3,472,427 | 10/1969 | Schaefer | 137/797 |
| 3,938,555 | 2/1976 | Swickley | 251/129.03 |
| 4,207,917 | 6/1980 | Opel . | |
| 4,470,429 | 9/1984 | Johnson | 137/556 |
| 4,627,597 | 12/1986 | Brausfeld . | |

Primary Examiner—A. Michael Chambers
Attorney, Agent, or Firm—Townsend and Townsend Khourie and Crew

[57] ABSTRACT

Setting device for a valve for the manual control of the position of a valve body. The handle portion of the setting device is provided with two wing portions extending in opposite circumferential directions outside a central portion of the handle portion. The handle portion can be manuvered by means of the screwdriver or the like, even in narrow spaces.

14 Claims, 3 Drawing Sheets

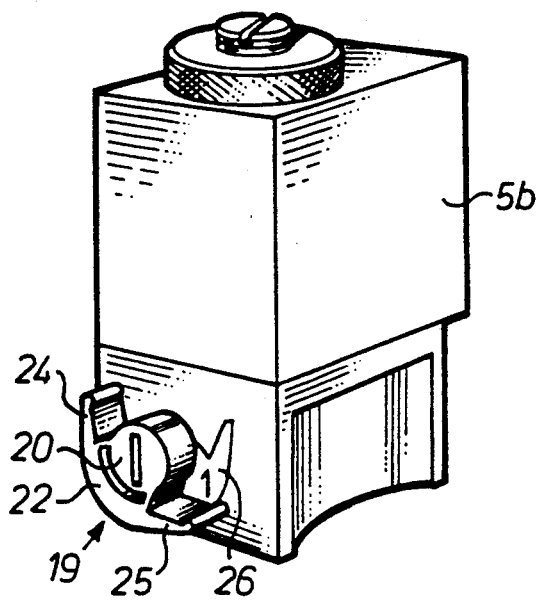
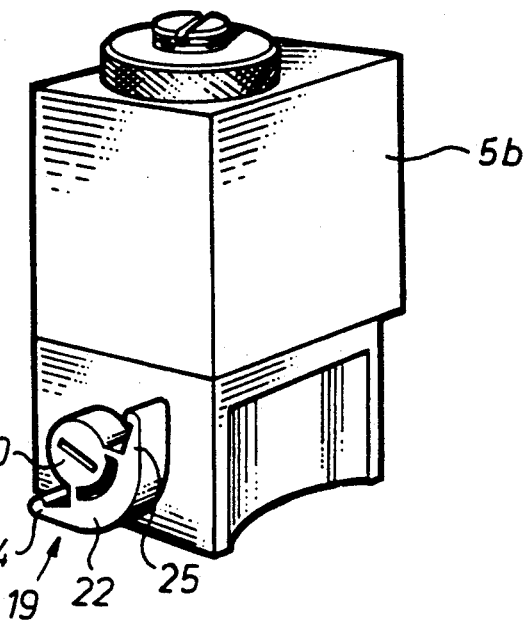
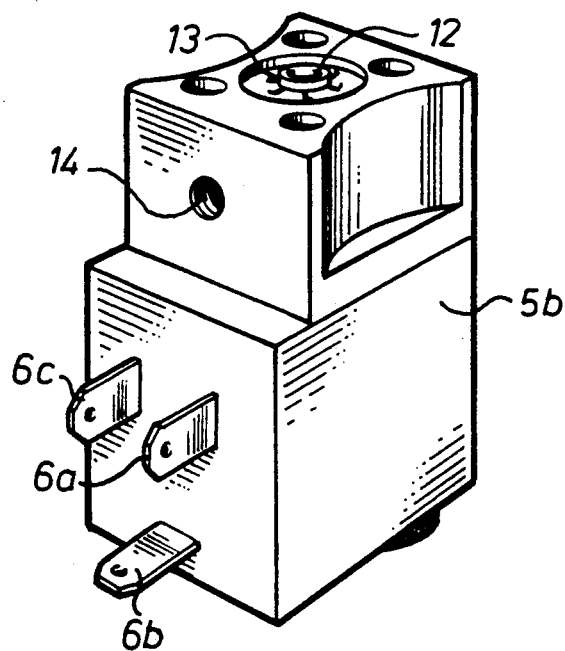

VALVE-SETTING DEVICE

The invention relates to a setting device for the manual setting of a valve according to the preamble of claim 1.

The setting device according to the invention is intended to be used with different kinds of valves, especially valves with a spring biased valve body. The invention aims to solve a special problem arising when arranging a number of relatively small valves, e.g. electrically controlled so-called pilot valves, in a valve battery. Then, the handle portions of the setting devices that are needed for the manual control of the respective valve, may either be made easily controlled by hand, in which case they must be given relatively large dimensions and consequently do not permit a compact arrangement of a number of valves close to one another, or be provided with a slot for a screw driver, in which case they may be made relatively small while at the same time requiring a free space axially relative to the handle portion for the application of the screw driver. In the above application, i.e. in connection with pilot valves, the setting devices are used for a manually controlled setting of the respective pilot valve, e.g. in connection with the initial adjustment or supervision of a pneumatic system with cylinders, valves etc. In normal operation of such a system, however, the pilot valves work under the control of electrical signals, wherein some other pneumatic component, e.g. a directional valve connected to an operating cylinder, is controlled in response thereto.

Thus, the underlying problem of the invention is to achieve a handle portion of a setting device having small dimensions and making simple control possible, e.g. by means of a thin, elongated object, such as a screw driver, also in very limited areas due to the compact arrangement of a number of valves close to one another.

This problem is solved by the principle design of the handle portion of the setting device disclosed in claim 1 with two wing portions extending in opposite directions circumferentially. The setting device may be easily rotated in the desired direction by applying a screw driver or the like against one of the wing portions, so that an axis portion of the setting device is rotated and the valve is hereby switched over. It is understood that manoeuvring of the setting device can be achieved very easily in this manner, even if the space around the handle portion is very limited. The screw driver does not have to be directed axially but may be oriented in different directions in view of the available space.

Further useful characteristics of the handle portion of the setting device according to the invention are specified in claims 2-8.

The invention makes a compact arrangement of valves possible, e.g. in a row with valves arranged in pairs with the handle portions of the setting devices facing each other in a relatively narrow space between the two valves in the respective pair.

The invention will be described in greater detail below with reference to the appended drawings.

FIGS. 3a and 3b show a pilot valve according to FIG. 2 in perspective views with the handle portion of the setting device in two different positions;

FIG. 3c shows the pilot valve in a perspective view from below;

Figure 1:
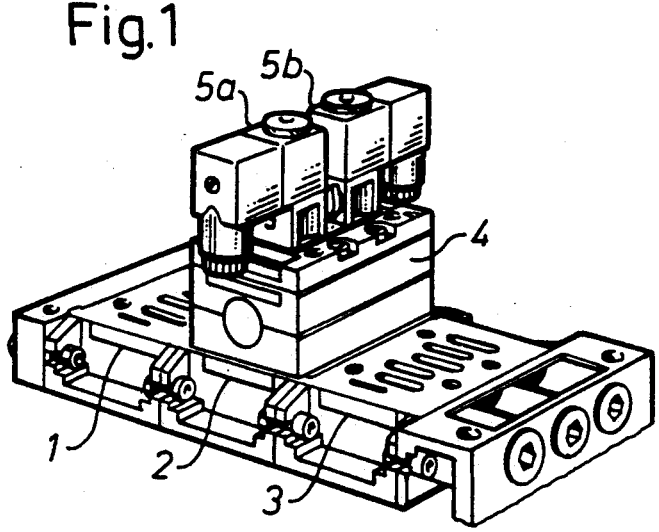
FIG. 1 shows a valve battery with a number of connection plates for the compact mounting of a row of directional valves and associated, so-called pilot valves.

In FIG. 1 a mounting plate is shown with a row of connection plates 1, 2, 3 mutually screwed together for the connection of a corresponding number of directional valves 4 (only one is shown in the figure) and associated, electrically controlled, so-called pilot valves 5a, 5b. The respective pilot valve is switched over by way of electrical signals, thereby actuating the associated directional valve 4 which controls an operating cylinder or the like.

Figure 2:
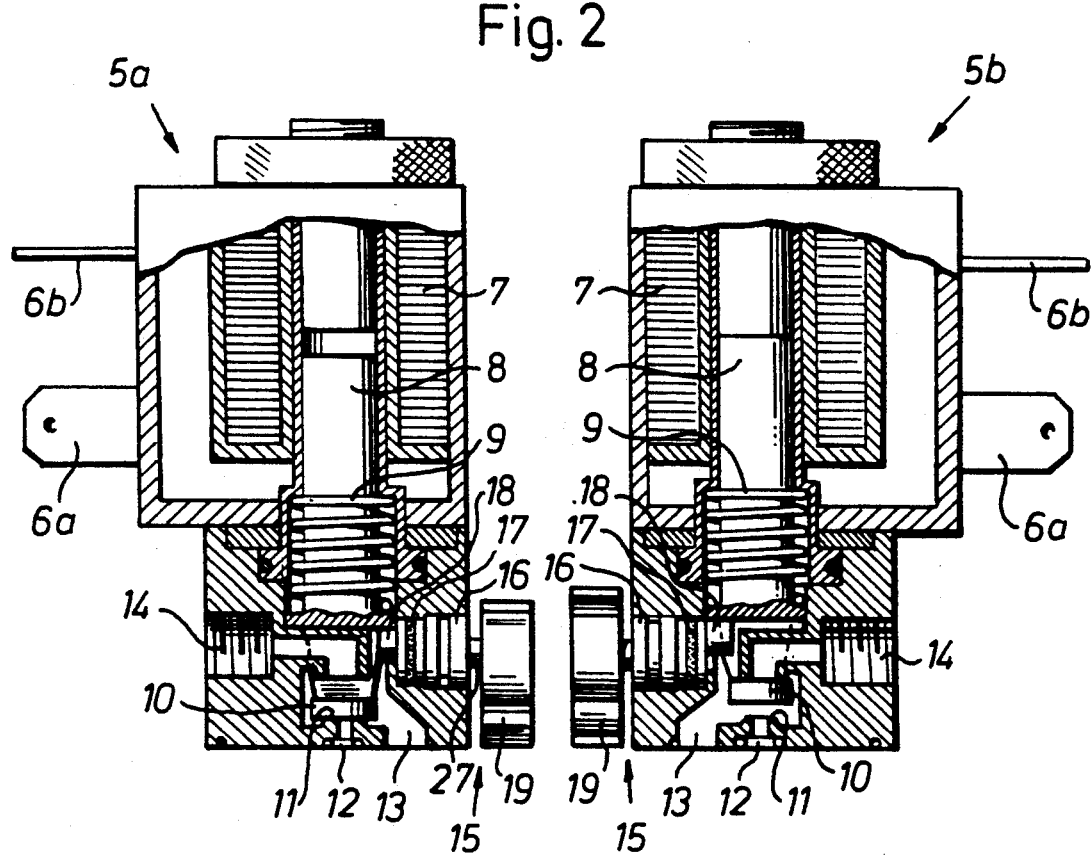
FIG. 2 shows a central section of two pilot valves placed close to one another (without cable connection) and provided with setting devices according to the invention.

The pilot valves 5a, 5b are shown in a larger scale in FIG. 2 without the electric cable connections. The pilot valve 5a, which is similar to the pilot valve 5b, although oriented in the opposite direction, is at its top provided with a magnetizing coil 7 connected to the electrical contacts 6a, 6b. The coil 7 will generate a magnetic field when energized by an electric current and will pull a plunge or a piston 8, biased by a return spring 9, from a lower end position (see the valve 5a to the left in FIG. 2) to an upper end position (see the valve 5b to the right in FIG. 2). Thereby, a disc shaped valve body 10 is lifted from a lower position in contact with a valve seat 11 into an upper position by the influence of pressurized air fed through an inlet port 12. In the lower position of the valve body 10 the inlet port 12 is closed, and the outlet port 13 communicates with an outlet port 14, whereas in the upper position of the valve body 10 (to the right) the outlet port 14 is closed, and the inlet port 12 is connected to the outlet port 13.

Figure 4A:
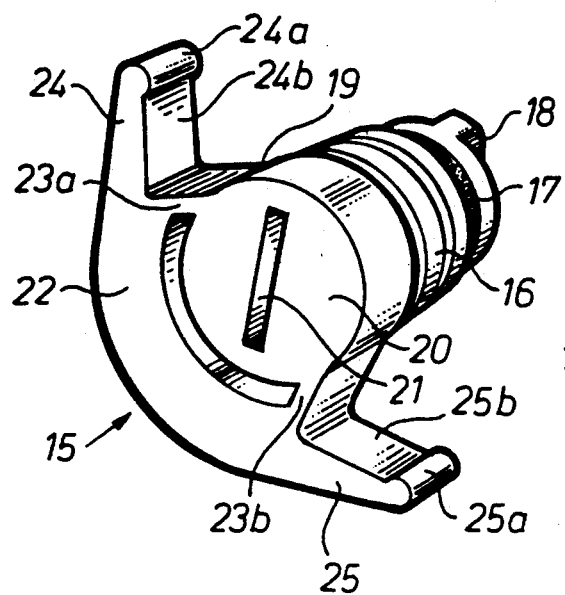
FIGS. 4a and 4b show the setting device in two different perspective views.
Figure 4B:
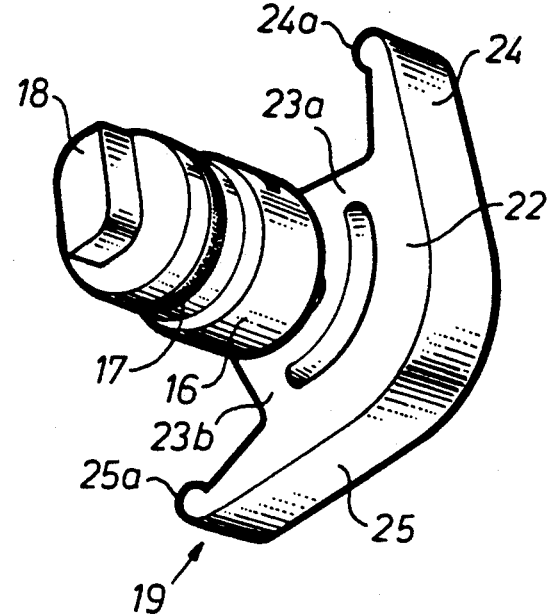
Figure 4C:
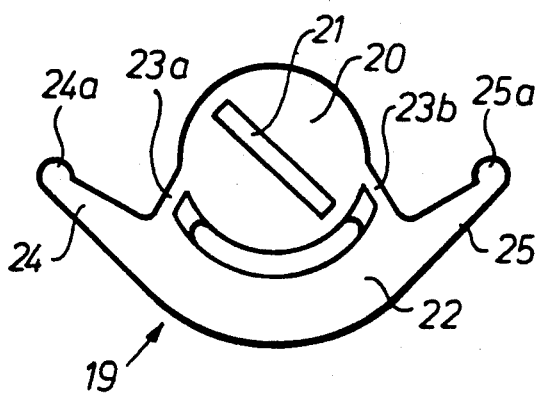
FIGS. 4c and 4d show the setting device in end views from the front side and from the back side, respectively.
Figure 4D:
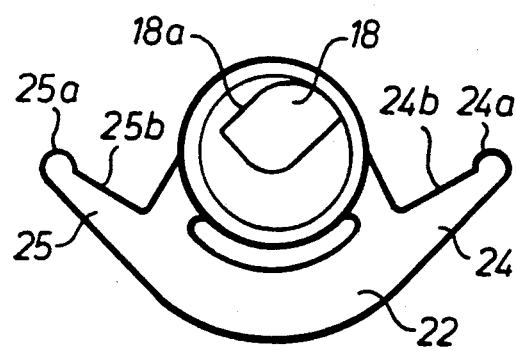

In normal operation the pilot valves 5a and 5b are switched over by way of electrical signals. However, e.g. when initially adjusting a pneumatic system connected to the pilot valves, it is desirable to switch or set the pilot valves manually to respective positions. For that purpose the pilot valves are provided with mechanical setting devices 15, which in a manner known per se are provided with an axis portion 16, which is rotatably mounted and sealed with a sealing ring 17 in a wall opening of the valve housing. At the inside, the axis portion 16 is provided with a cam means 18 (cf. also FIGS. 4a-d) with a cam surface 18a (see FIG. 4d), against which an end surface of the piston 8 is in contact when the coil 7 is not energized. Thus, when the coil 7 is not energized, the pilot valve can be switched by rotating the axis portion 16 of the setting device.

The arrangement described so far is essentially previously known. However, the external handle portion 19 of the setting device 15 is designed in a special way according to the present invention.

As will best appear from FIGS. 4a-d, the setting device 15 is made in one piece, preferably from a plastic material, wherein the handle portion 19 consists firstly of a central, substantially cylindrical portion 20, the diameter of which is only somewhat larger than that of the axis portion 16 and which on its end surface is provided with a diametrical groove 21 for the application of a screw driver or the like (if the space around the valve so allows), and secondly of an arcuate body 22 located radially outside the central portion 20 and attached to the central portion 20 by means of relatively thin (and consequently breakable), essentially radially extending bridge portions 23a, 23b.

The arcuate body forms at its end two wing portions 24, 25 extending in opposite directions circumferentially. These wing portions taper towards the respective free end and are provided with essentially planar inner and outer surfaces. Thus, the wing portions are directed obliquely outwards from the essentially circular arcuate mid body portion of the body 22. The free ends of the wing portions are provided with beads or hooks 24a and 25a, respectively, serving to prevent a screw driver or the like from slipping off the end of the wing portion when being pressed against the planar inner surface of the wing portion 24b or 25b, respectively.

From the drawing figures (cf. also FIGS. 2, 3a and 3b) it is further apparent that the handle portion 19 is relatively flat, i.e. its axial dimensions are substantially less than its radial dimensions. The ends of the wing portions or the beads 24a, 25a are located approximately diametrically on opposite sides of the axis at a mutual distance which is several times greater (in the shown example about 3 times greater) than the diameter of the central portion 20.

It should be apparent that this configuration of the handle portion 19 of the setting device will make it easy to manoeuvre the setting device with the aid of a screw driver, pencil or any other elongated object oriented essentially in a plane transverse to the axis of the setting device (with the tip or end of the object applied against the inner surface 24b or 25b of the respective wing portion). This can be achieved easily and conveniently even if the space is very limited (cf. FIG. 2, where the two pilot valves, if so desired, could be placed even closer to one another as a result of the flat handle portions).

In FIG. 3a the pilot valve 5b with the handle portion 19 is shown in its closing position (corresponding to the position of the valve 5a to the left in FIG. 2), while FIG. 3b shows the same valve with the handle portion 19 turned to an opening position. Adjacent to the wall opening of the valve housing, a colour making 26 is applied onto the surface area uncovered by the handle portion upon turning the same. The colour should be chosen in view of the best possible contrast to the remaining surface, e.g. light, preferably white colour if the remaining surface is black. Moreover (or alternatively), a symbol, in the illustrated example the digit 1, can be applied in the same area to clearly indicate the position of the valve.

FIG. 3c shows the pilot valve 5b obliquely from below, the ports 12, 13, 14 being visible as well as all three electrical contact pins 6a, 6b, 6c.

Upon completion of the initial adjustment of the pneumatic system associated to the pilot valve, the arcuate body 22 with the wing portions 24, 25 can be broken off from the central portion 20 of the handle portion to prevent unintentional movement of the handle portion. It is also possible to break loose the central portion 20, since the latter is connected to the axis portion 16 by way of a weak portion 27, which has a very small diameter and functions as a breakable weak spot (see FIG. 2).

The setting device according to the invention can of course be used in general with different types of valves, where the handle portion is difficult to reach for one reason or the other. By modifying the cam surface, the setting range can be extended to more than two positions (end positions), possibly also to continuously variable setting positions, if the friction of the setting device relative to the valve housing is greater than the force of the spring acting on the valve body or an associated element (corresponding to the piston 8 of the embodiment shown) with which the cam surface is engaged. This element does not necessarily have to be spring loaded. The setting device according to the invention could be modified also in other respects within the scope of the following claims.

What is claim is:

1. A device for manually setting a position of a valve body in a valve, comprising:
    a valve mounted close to at least one other valve in a compact arrangement;
    said valve including a valve housing and a valve body movable therein;
    an axis portion being mounted in a wall opening in said valve housing and being provided, inside said valve housing, with a cam surface and, outside said valve housing, with a manually controllable handle;
    said axis portion being rotatable so as to displace said valve body by means of said cam surface;
    said handle including a central portion secured to said axis portion and two wing portions, said wing portions located radially outside said central portion and extending in opposite circumferential directions in relation to said axis portion;
    whereby said valve body is displaceable by applying an elongated object onto one of said wing portions so as to rotate said axis portion.

2. A device for manually positioning a valve body according to claim 9, wherein each wing portion has a free end forming a bead or a hook directed radially inwardly towards said central portion.

3. A device for manually positioning a valve body according to claim 9, wherein the two wing portions form parts of an arcuate body located radially outside said central portion.

4. A device for manually positioning a valve body according to claim 3, wherein said central portion and said arcuate body are made in one piece with intermediate bridge portions formed as breakable weak spots.

5. A device for manually positioning a valve body according to claim 4, wherein said axis portion and said cam surface are made integral with said handle.

6. A device for manually positioning a valve body according to claim 9, wherein said handle and its wing portions extend mainly in a radial plane with a small axial thickness.

7. A device for manually positioning a valve body according to claim 9, wherein said valve housing is provided with a marking adjacent to said wall opening, the marking being concealed by the handle in a certain rotational position but being at least partly visible upon rotation of said axis portion.

8. A device for manually positioning a valve body according to claim 9, wherein said valve is located close to a similar valve with respective handle facing one another.

9. A valve setting device, for manually setting a valve using an elongated actuator having a distal end, comprising:
    said valve including a valve housing and a valve body movable therein;

an axis portion being rotatably mounted in a wall opening in said valve housing for movement about an axis, the axis portion being provided at one end, within said valve housing, with a cam surface and an opposite end, outside of said valve housing, with a manually controllable handle;

said cam surface engaging said valve body, whereby said valve body is displaced due to rotational movement of said axis portion;

said handle including a central portion secured to said axis portion and at least one drive extension extending from said central portion transverse to said axis;

said drive extension having a concavity adapted to be drivenly engaged by the distal end of the elongate actuator so that the user can rotate the axis portion by forcing the distal end of the elongate actuator against the drive extension.

10. The device of claim 10 further comprising a frangible connecting element securing said drive extension to said central portion so that said drive extension can be broken away from the central portion.

11. The device of claim 10 wherein said central portion and said drive extensions are formed in one piece with said frangible element forming a bridge between said central portion and said drive surface extension.

12. The device of claim 9 wherein first and second of said drive extensions extend in opposite circumferential directions from said central portion of said handle.

13. The device of claim 9 wherein said concavity is defined in part by a bead at a distal end of the drive extension.

14. The device of claim 9 wherein said drive surface extension forms an arcuate body located radially outside said central portion.

* * * * *